United States Patent [19]

Edwards

[11] Patent Number: 5,023,313
[45] Date of Patent: Jun. 11, 1991

[54] ACRYLIC RESIN COMPOSITION

[76] Inventor: Bill R. Edwards, 10311 Merton St., Wichita, Kans. 67209

[21] Appl. No.: 528,728

[22] Filed: May 23, 1990

Related U.S. Application Data

[62] Division of Ser. No. 386,501, Jul. 27, 1989, Pat. No. 4,945,122.

[51] Int. Cl.$^5$ ............................ C08K 5/42; C08F 2/38
[52] U.S. Cl. ................................. 524/166; 526/224; 526/314; 526/332
[58] Field of Search ............... 524/166; 526/224, 314, 526/332

[56] References Cited

U.S. PATENT DOCUMENTS

| | | | |
|---|---|---|---|
| Re. 31,165 | 3/1983 | Serini et al. | 525/67 |
| 2,445,536 | 7/1948 | Parsons | 260/77.5 |
| 2,964,501 | 12/1960 | Sarofeen | 260/77.5 |
| 3,250,813 | 5/1966 | Stephenson | 260/614 |
| 3,268,484 | 8/1966 | Costanza et al. | 260/77.5 |
| 3,487,062 | 12/1969 | Bodycot | 260/89.5 |
| 3,847,865 | 11/1974 | Duggins | 260/42.52 |
| 3,957,921 | 5/1976 | Iwahashi et al. | 260/901 |
| 4,113,803 | 9/1978 | Price | 260/885 |
| 4,152,506 | 5/1979 | Novak | 526/224 |
| 4,159,301 | 6/1979 | Buser et al. | 264/331 |
| 4,214,064 | 7/1980 | Kanazawa | 526/193 |
| 4,260,564 | 4/1981 | Balocchi et al. | 264/2.2 |
| 4,319,003 | 3/1982 | Gardlund | 525/148 |
| 4,528,351 | 7/1985 | Tarumi et al. | 526/314 |
| 4,588,798 | 5/1986 | Heitner | 526/228 |
| 4,743,654 | 5/1988 | Kyu et al. | 525/148 |
| 4,745,029 | 5/1988 | Kambour | 428/412 |
| 4,791,184 | 12/1988 | Nagai et al. | 526/323.2 |

FOREIGN PATENT DOCUMENTS 1192683  4/1989  Japan.
1103947  2/1968  United Kingdom.

Primary Examiner—Joseph L. Schofer
Assistant Examiner—N. Sarofim
Attorney, Agent, or Firm—Bill D. McCarthy; Glen M. Burdick

[57] ABSTRACT

An acrylic resin is provided which has excellent weatherability, outstanding transparency and improved heat and solvent resistance, as well as improved impact strength. The acrylic resin comprises an intimate blend of a polymerization syrup and a catalytic amount of a polymerization catalyst capable of effecting polymerization of the syrup. The polymerization syrup, which has an improved shelf life and can be stored at ambient temperature and atmospheric pressure, consists essentially of:

(a) from about 300 to about 1000 parts per volume of an acrylic monomer represented by the formula

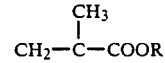

wherein R is an alkyl moiety containing 1 to about 18 carbon atoms;
(b) from about 0.1 to about 1 parts by volume of 2,2-bis(allyl-oxymethyl)-butan-1-ol;
(c) from about 0.5 to about 5 parts by volume of a mercaptan; and
(d) from about 0.3 to about 40 parts by volume of a crosslinking agent compatible with the acrylic monomer.

The polymerization syrup can further contain from about 1 to about 100 parts by volume of a polycarbonate compound.

24 Claims, No Drawings

ACRYLIC RESIN COMPOSITION

This is a divisional of copening application Ser. No. 07/386,501 filed on July 27, 1989, now U.S. Pat. No. 4,945,122.

BACKGROUND OF THE INVENTION

1. Field of the Invention

The present invention relates to acrylic resin compositions, and more particularly but not by way of limitation, to an acrylic monomer based polymerization syrup having an improved shelf life which. In one aspect the present invention relates to an acrylic monomer containing polymerization syrup which, upon addition of a quaternary ammonium salt polymerization catalyst, is curable at ambient temperatures and pressure.

2. Brief Description of the Prior Art

Acrylic resins formed predominantly of methyl methacrylate have heretofore been known. Because acrylic resins formed of methyl methacrylate are linear polymers, the polymers have exhibited good weatherability and transparency. However, such polymers have suffered from disadvantages in that they are deficient in resistance to heat, solvents, shock, and surface hardness. Because of these deficiencies the prior art is replete with acrylic based resin compositions wherein the base polymer, i.e. methyl methacrylate, is copolymerized with other polymers in an effort to overcome the before-stated deficiencies of such resins. Examples of several plastic resin compositions, and methods for producing such compositions which have heretofore been employed to overcome the inherent deficiencies of the acrylic resin compositions wherein methyl methacrylate is employed as the base monomer are U S. Pat.No. 4,791,184, issued Dec. 13, 1988 to Nagai, et. al.; U.S. Pat. No. 4,319,003, issued Mar. 9, 1982 to Gardlund; U.S. Pat. No. 4,214,064, issued July 22, 1980 to Kanazawa; U.S. Pat. No. 4,152,506, issued May 1, 1979 to Novak; and U.S. Pat. No. 3,957,921, issued May 18, 1976 to Iwahashi, et. al.

While various methods and resin compositions have been proposed for improving the resistance to heat, solvents, shock and surface hardness of acrylic based resins (without sacrificing the desired properties of weatherability and transparency of such resins), the resulting modified polymers have a tendency to become colored on heating and the desired properties of weatherability, transparency and color are often sacrificed or reduced.

Thus, it would be desirable if one could develop a polymerization syrup of an acrylic monomer which would maintain all of the desired properties of an acrylic resin, while at the same time overcome the known deficiencies of an acrylic resin. Further, it would also be desirable if one could formulate an acrylic resin composition which maintains its desired properties when cast into thick sheets or articles, and which would be substantially void or bubble free, and which did not require post curing. It is to such a polymerization syrup and resin composition that the present invention is directed.

SUMMARY OF THE INVENTION

In accordance with the present invention an acrylic resin is provided which has excellent weatherability, outstanding transparency and improved heat and solvent resistance, as well as improved impact strength. The acrylic resin comprises an intimate blend of a polymerization syrup and a catalytic amount of a polymerization catalyst capable of effecting polymerization of the syrup. The polymerization syrup consists essentially of:

(a) from about 300 to about 1000 parts per volume of an acrylic monomer represented by the formula

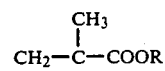

wherein R is an alkyl moiety containing 1 to about 18 carbon atoms;

(b) from about 0.1 to about 1 parts by volume of a non-peroxide oxygen donator, i.e. 2, 2-bis(allyloxymethyl)-butan-1-ol;

(c) from about 0.5 to about 5 parts by volume of a mercaptan; and (d) from about 0.3 to about 40 parts by volume of a crosslinking agent compatible with the acrylic monomer.

The acrylic monomer containing polymerization syrup described above, in addition to having an improved shelf life, can also be stored at ambient temperatures and pressure without deterioration of the syrup. That is, the polymerization syrup of the present invention can be stored and transported without the need of refrigeration. However, the shelf life of the polymerization syrup has been enhanced by the addition of from about 1 to about 100 parts by volume of a polycarbonate compound such as allyl diglycol carbonate.

An object of the present invention is to provide a novel acrylic resin and a method for the production thereof.

Another object of the present invention, while achieving the before stated object, is to provide an acrylic resin excelling in physical properties, such as heat and solvent resistance without sacrificing the desired properties of transparency and weatherability.

Yet another object of the present invention, while achieving the before stated objects, is to provide a polymerization syrup for an acrylic resin which, when admixed with an effective amount of a polymerization catalyst, permits the resulting resin composition to be cured at ambient temperatures and pressure. Still another object of the present invention, while achieving the before stated objects, is to provide a polymerization syrup for an acrylic resin having improved shelf life.

Other objects, advantages and features of the present invention will become apparent upon reading of the following detailed description in conjunction with the appended claims.

DETAILED DESCRIPTION

The present invention provides a polymerization syrup having an improved shelf life which, when admixed with a catalytic amount of a polymerization catalyst capable of effecting polymerization of the syrup, provides an acrylic resin composition which is curable at ambient temperatures and pressure. The polymerization syrup consists essentially of:

(a) from about 300 to about 1000 parts by volume of an acrylic monomer represented by the formula

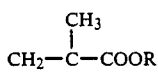

wherein R is an alkyl moiety containing 1 to about 18 carbon atoms;

(b) from about 0.1 to about 1 parts by volume of a non-peroxide oxygen donator, such as 2, 2-bis(allyloxymethyl)-butan-1-ol;

(c) from about 0.5 to about 5 parts by volume of a mercaptan; and (d) from about 0.3 to about 40 parts by volume of a crosslinking agent compatible with the acrylic monomer.

In formulating the polymerization syrup of the present invention, any suitable acrylic monomer represented by the formula

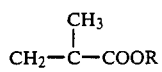

wherein R is an alkyl moiety containing 1 to about 18 carbon atoms, more desirably from 1 to 8 carbon atoms can be employed provided that the acrylic monomer is a liquid at ambient temperature. Examples of alkyl moieties satisfying the definition for R of the before-described formula include methyl, ethyl, propyl, butyl, pentyl, hexyl, heptyl, octyl, nonyl, decyl, undecyl, dodecyl, tetradecyl, pentadecyl, hexadecyl, heptadecyl, octadecyl and the like. Specific examples of an acrylic monomer satisfying the above defined formula include methyl methacrylate, ethyl methacrylate, n-butyl methacrylate, 2-ethylhexyl methacrylate, cyclohexyl methacrylate, $\omega$-hydroxyalkyl methacrylates, and the like.

The mercaptan employed in the formulation of the polymerization syrup is represented by the general formula

RSH where R contains from 1 to about 22 carbon atoms. Further, R can be any suitable moiety, such as an alkyl moiety, a cycloaliphatic moiety and the like. Illustrative of such mercaptans are methyl mercaptan, propyl mercaptan, dilimonen dimercaptan, cyclohexyl dimercaptan, ethylcyclohexyl dimercaptan and mixed primary tridecyl mercaptan.

It should be noted that the only requirement for the mercaptan is that the mercaptan be in liquid form under the conditions of mixing, and that the mercaptan be compatible with the particular acrylic monomer employed in the formulation of the polymerization syrup, as well as with the non-peroxide oxygen donator, i.e. 2, 2-bis(allyloxymethyl)-butan-1-ol, and the crosslinking agent employed in the formulation.

In order to produce an acrylic resin which can be cured at ambient temperatures and pressure, that is, without the requirement of a post curing step, the polymerization syrup (in addition to the acrylic monomer, the non-peroxide oxygen donator and the mercaptan) further includes a crosslinking agent. The amount of crosslinking agent employed can vary widely and will be determined to a large degree by the efficiency of the crosslinking agent when admixed with a polymerization catalyst. That is, for a strong crosslinking agent such as ethylene glycol dimethacrylate, the concentration of the crosslinking agent required will be slightly more.

However, it has generally been found that when formulating a polymerization syrup of the present invention that the amount of crosslinking agent, although same can vary widely, will generally be from about 0.3 to about 40 parts by volume of the crosslinking agent. Typical crosslinking agents which may be employed in the formulation of the polymerization syrup, in addition to ethylene glycol dimethacrylate, include allyl methacrylate, allyl acrylate, ethylene glycol diacrylate, polyethylene gycol dimethacrylate, diethylene glycol dimethacrylate, and triethylene glycol dimethacrylate.

As previously indicated, the amount of crosslinking agent incorporated into the polymerization syrup can vary widely, depending to a large degree on the particular crosslinking agent employed. However, desirable results can generally be obtained when the crosslinking agent is incorporated not the syrup in an amount sufficient to provide from about 0.3 to about 40 parts by volume of the crosslinking agent.

To stabilize the polymerization syrup and thus enhance the shelf life of the syrup, the polymerization syrup may further include an effective amount of a polycarbonate compound. The amount of polycarbonate compound incorporated into the polymerization syrup can vary widely but will generally be in an amount to provide from about 1 to about 100 parts by volume of the polycarbonate compound in the syrup.

Any suitable polycarbonate compound which is compatible with the acrylic monomer can be employed in the formulation of the polymerization syrup. However, desirable results have been obtained wherein the polycarbonate compound is allyl diglycol carbonate.

It should be noted that in formulating a polymerization syrup as set forth above, one does not need Lo incorporate polymerization inhibitors into the syrup in order to prevent undesired or premature polymerization. That is, it has been unexpectedly found that the shelf life of the polymerization syrup can be improved to a desirable level, without the need of refrigeration, when the syrup is formulated as set forth above; and that the shelf life can be further enhanced by incorporation of from about 1 part to about 100 parts by volume of the polycarbonate compound per volume of the syrup, and more desirably from about 25 to about 50 parts by volume of the polycarbonate compound.

To enhance mold release it is often desirable to incorporate into the polymerization syrup an effective minor amount of an internal mold release agent. The amount of the internal mold release agent can vary widely, but will generally be in an amount sufficient to provide the syrup with from about 0.01 to about 2 parts per volume of the internal mold release agent.

Any suitable internal mold release agent can be employed in the formulation of the polymerization syrup provided that the mold release agent is compatible with the other ingredients constituting the syrup. For example, desirable results have been obtained wherein the internal mold release agent is a surfactant, and wherein the surfactant is an anionic or nonionic surfactant which is compatible with the acrylic monomer and which does not reduce the transparency of the resulting polymeric resin. Examples of the suitable anionic surfactant include:

sodium alkyl sulfate, (such as sodium octylsulfate, sodium laurylsulfate, sodium stearylsulfate);

sodium alkylbenzenesulfates, such as sodium dodecylbenzenesulfate;

sodium alkylsulfonates, such as sodium cetylsulfonate and sodium stearylsulfonate;

sodium dialkyl sulfosuccinates, such as sodium dioctyl sulfosuccinate, and the like.

Examples of nonionic surfactants include:

polyethyleneglycol alkyl ethers, such as polyethyleneglycol oleyl ether, polyethyleneglycol lauryl ether, and the like;

polyethyleneglycol alkylphenyl ethers, such as polyethyleneglycol nonylphenyl ether;

higher fatty acid esters of polyethyleneglycol, such as oleic acid ester of polyethyleneglycol, stearic acid ester of polyethyleneglycol, lauric acid ester of polyethyleneglycol, and the like;

polyethyleneglycol polypropyleneglycol ether;

sorbitan fatty acid esters, such as sorbitan monolaurate, sorbitan monostearate, and the like;

polyethyleneglycol sorbitan fatty acid esters, such as polyethyleneglycol sorbitan monolauric acid ester, polyethyleneglycol sorbitan monooleic acid ester, phosphoric acid esters of polyethyleneglycol; and phosphoric acid esters of alkylpolyethyleneglycol and the like.

The surfactants listed above are merely illustrative of anionic and nononic surfactants which can be employed as the internal mold release agent in the formulation of the polymerization syrup of the present invention. However, desirable results have been obtained wherein the surfactant is sodium dioctyl sulfosuccnate.

A polymerization syrup formulated as set forth above, whether same incorporates the polycarbonate compound and/or the mod release agent, can be catalyzed by a catalytic amount of quaternary ammonium salts generally known as "fabric softeners". The acrylic resin formulated from the polymerization syrup and the quaternary ammonium salt catalyst provides a resin molding material which can be cured at ambient temperatures and atmospheric pressure to produce articles having the desired properties of an acrylic resin, that is, the desired properties of transparency and weatherability, while improving the impact strength and the heat and solvent resistance of the resin composition. Further, it should be noted that when employing the resin composition, articles can be molded having a thickness of up to four inches or greater which do not require post curing treatment, and are substantially void or bubble free. Thus, it becomes apparent that the unique polymerization syrup and the resin which results from admixing a catalytic amount of the quaternary ammonium salt polymerization catalyst with the syrup represents an advance in the state of the art of acrylic resins.

As previously stated, the quaternary ammonium salt employed as the catalyst for the polymerization syrup of the present invention are generally known in the industry as "fabric softeners". Illustrative examples of such quaternary ammonium salts are as follows:

Dialkyldimethylammonium chlorides, such as dicocodimethylammonium chloride and ditallowdimethylammonium chloride;

Dialkyldimethylammonium methylsulfates;

Alkyltrimethylammonium chlorides, such as soya trimethylammonium chloride, hydrogenated tallow trimethylammonium chloride, palmityltrimethylammonium chloride, cocotrimethylammonium chloride, tallow trimethylammonium chloride, and benzyltrimethylammonium chloride; and Alkyldimethylbenzylammonium chlorides, such as dimethylalkyl ($C_{14}$–$C_{18}$) benzylammonium chloride and dimethylalkyl ($C_{12}$–$C_{16}$) benzylammonium chloride.

It should be noted that the above examples are merely illustrative of the quaternary ammonium salts which can be used in the formulation of the additive for polyester resinous compositions having improved curing and color clarity properties. Further, of such quaternary ammonium salts it is believed that the most desirable of such salts for use in the formulation of the additive of the present invention are dicocodimethylammonium chloride, benzyltrimethylammonium chloride, trimethyldodecylammonium chloride dimethylalkyl ($C_{12}$–$C_{16}$) benzylammonium chloride and dimethylstearylbenzylammonium chloride.

The amount of the quaternary ammonium salt employed to catalyze the polymerization syrup can vary widely and will be dependent to a large degree upon the acrylic monomer employed in the formulation of the polymerization syrup, as well as the quaternary ammonium salt chosen as the catalyst. However, generally the amount of the quaternary ammonium salt employed to catalyze the polymerization syrup will be an amount sufficient to provide from about 0.1 to about 15 parts by volume of the catalyst, based on the total volume of the monomer present in the polymerization syrup.

PREPARATION OF POLYMERIZATION SYRUP

In the preparation of the polymerization syrup of the present invention an acrylic monomer satisfying the formula heretofore described is selected. While any suitable acrylic monomer satisfying the definition of the acrylic monomer set forth hereinbefore can be employed, especially desirable results have been obtained wherein the acrylic monomer is methyl methacrylate.

The acrylic monomer is transferred to a mixing vessel and effective minor amounts of a non-peroxide oxygen donator, such as 2, 2-bis(allyloxymethyl)-butanl -ol, a mercaptan and a crosslinking agent compatible with the acrylic monomer are admixed with the acrylic monomer to form an intimate blend containing from about 300 to 1000 parts by volume of the acrylic monomer, from about 0.1 to about 1 parts by volume of the 2, 2-bis(allyloxymethyl)-butan-1-ol, from about 0.5 to about 5 parts by volume of the mercaptan, and from about 0.3 to about 40 parts by volume of the crosslinking agent.

When the intimate blend of the four described ingredients has been formulated, the blend is heated to a temperature of from about 80 degrees Centigrade to about 110 degrees Centigrade for a period of time effective to provide the blend with a desired viscosity. That is, the intimate blend is heated at the specified temperature for a period of time so that the viscosity of the syrup ca be controlled depending upon the end use for which the polymerization syrup is to be employed.

When the syrup has achieved the desired viscosity, heat is removed and the blend allowed to cool prior to storage. It should be noted that in the preparation of the polymerization syrup as set forth above an improved shelf life of the syrup can be achieved, without the need of refrigeration or other cooling of the syrup to prevent polymerization or deterioration of the syrup when same is stored.

While the polymerization syrup prepared in accordance with the procedures above has exhibited improved shelf life, that is, the syrup has demonstrated a storabilty of at least six weeks at ambient temperatures without any detectable changes as to its viscosity or deterioration, the shelf life of the polymerization syrup can be further enhanced by incorporating not the nitrate blend, prior to heating, from about 1 to about 100 parts by volume of a polycarbonate compound compatible with the acrylic monomer. While any polycarbonate compound compatible with the acrylic monomer can be employed, desirable results have been obtained When the polycarbonate compound is allyl diglycol carbonate.

To enhance the removal of articles from a mold (when such articles are fabricated of a polymeric resin consisting essentially of the polymerization syrup as heretofore described and a catalytic amount of a quaternary ammonium salt), an effective minor amount of the internal mold release agent can be incorporated into the intimate blend.

As previously stated, the effective minor amount of the internal mold release agent employed can vary widely but will generally be from about 0.1 to about 2 parts by volume of the release agent per total volume of the syrup. Further, the internal release agent can be any suitable surfactant which is compatible with the acrylic monomer.

In addition to the internal mold release agent, other additives which do not interfere with the quality or characteristics of the polymerization syrup can be incorporated into the syrup. Typical of such other additives are coloring agents, ultraviolet absorbers, glass fibers or any other appropriate additive which may be desired dependent on the end use of the polymerization syrup.

As mentioned above, the polymerization syrup of the present invention has a remarkably improved shelf life, and the syrup does not need to be stored in refrigerated conditions to maintain the integrity of the syrup. In addition, the acrylic resin compositions formulated of the polymerization syrup and a catalytic amount of a quaternary ammonium salt exhibit improved thermal stability without deterioration of the excellent weathering resistance, transparency and color of the resin composition.

The unique characteristics of the acrylic resin permit one to cast the resin in four inches or greater thickness, while at the same time providing a resin composition which can be cured at ambient temperatures and atmospheric pressure, and which does not require any post curing treatment. That is, the unique acrylic resin composition of the present invention allows one to substantially reduce the pour to pull time and does not require heat or vacuum in order to cure the resin. Under normal circumstances when employing the acrylic resin of the present invention, the pour to pull time of articles, even those having a thickness of up to about four inches, is less than about 8 hours.

Should one desire to shorten the pour to pull time of the acrylic resins of the present invention, such can readily be achieved by initially heating the mold for a relatively short period of time. While the temperature to which the mold is heated to enhance curing of the acrylic resin (as well as the period of time the mold is heated) can vary, generally one can enhance the curing of the acrylic resin by heating the mold at a temperature of from about 40 degrees Centigrade to 65 degrees Centigrade for a period of up to about 30 minutes without altering the properties of the acrylic resin.

In order to further illustrate the present invention the following examples are given. However, it is to be understood that the examples are for illustrative purposes only and are not to be construed as limiting the scope of the subject invention.

EXAMPLE I

Polymerization syrup was prepared by admixing the following ingredients to form an intimate blend:
500 m of methyl methacrylate monomer
0.9 ml of 2, 2-bis(alyloxymethyl)-butan-1-ol
1.5 ml of n-octyl mercaptan
40 ml ethylene glycol dimethacrylate
The ingredients were stirred under suitable conditions to insure that the intimate blend was obtained and that the blend was substantially homogeneous in nature.

The intimate blend produced above was then heated in a water bath maintained at approximately 100 degrees Centigrade for a period of from 2 to 4 hours. The heating period was varied so as to provide the polymerization syrup with a predetermined viscosity. When the desired viscosity had been achieved (such viscosity depending solely upon the end use for the acrylic resin to be formulated from the polymerization syrup) the polymerization syrup was allowed to cool, placed in a glass container, and the container was sealed.

The sealed glass container was stored at ambient temperature and atmospheric pressure to determine the shelf life of the polymerization syrup. An examination of the syrup was conducted to determine the integrity of the syrup during the storage period. At the end of a three month period a slight deterioration of the syrup was detected, thus illustrating that the syrup containing the methyl methacrylate monomer, 2, 2-bis(allyloxymethyl)-butan-1-ol, n-octyl mercaptan and ethylene glycol dimethacrylate had a useful shelf life at ambient temperatures and atmospheric pressure of about three months.

EXAMPLE II

Polymerization syrup was formulated in accordance with the procedure of Example I with the exception that 30 m of polycarbonate compound (i.e allyl diglycol carbonate) was incorporated into the blend prior to heating. The polymerization syrup containing the polycarbonate-compound was cooled, placed in a glass container, sealed and stored at ambient temperature and atmospheric pressure. Examinations of the syrup were conducted to determine the integrity of the syrup during the storage period It was observed after a nine month storage period that no deterioration of the syrup could be detected, that is, the viscosity of the syrup was substantially unchanged, and no polymerization of the monomer could be detected. Thus, the experiments substantiated that by incorporating a minor effective amount of a polycarbonate compound into the polymerization syrup of the present invention that a syrup is provided Which has an unexpected, substantially improved shelf life, and that the syrup can be stored at ambient temperature and atmospheric pressure. That is, the new and unique polymerization syrups of the present invention have an improved shelf life and do not require refrigeration in order to maintain the integrity of the polymerization syrup.

EXAMPLE III 1 ml of benzyltrimethylammonium chloride (a quaternary ammonium salt catalyst) was admixed with 1000 ml of the syrup prepared using the procedure o Example I. The resulting resin was poured into molds of various configurations and having thicknesses of from about 1 inch to about 3 inches. The resin was then allowed to cure at ambient temperature and atmospheric pressure. The curing time for the resin varied depending upon the thickness of mold cavity, that is, a mold employed to fabricate a slab of material having a thickness of about 1 inch cured in about 2 hours; whereas the mold employed to fabricate the article having a thickness of about 3 inches cured in about 8 hours. At the end of the curing period the resulting molded articles were removed from the mold. The articles had a tendency to adhere to the surfaces of the mold, thus requiring more effort to remove the articles from the mold.

EXAMPLE IV

A polymeric resin was formulated utilizing the procedure of Example III except the syrup was formulated using the procedure of Example II and the syrup contained about 1.5 parts by volume of sodium dioctyl sulfosuccinate, and an anionic surfactant which functioned as an internal mold release agent. The same molding conditions were carried out as Example III, and after curing the articles were readily removable from the mold without any adherence to the surface of the mold.

EXAMPLE V

A polymeric resin was formulated utilizing the procedure of Example III except the syrup was formulated using the procedure of Example I and the syrup contained about 1.5 parts by volume of sodium dioctyl sulfosuccinate, and an anionic surfactant which functioned as an internal mold release agent. The same molding conditions were carried out as Example III, and after curing the articles were readily removable from the mold without any adherence to the surface of the mold.

The articles molded employing the catalyzed polymerization syrups and procedures set forth above exhibited excellent clarity and improved resistance to solvent and heat. Further, the articles were extremely durable and had an improved impact strength when compared to articles fabricated using conventional acrylic resins.

It is clear that the present invention is well adapted to carry out the objects and attain the ends and advantages mentioned therein. While presently preferred embodiments of the invention have been described for purposes of this disclosure, numerous changes may be made which will readily suggest themselves to those skilled in the art and which are encompassed within the spirit of the invention disclosed and as defined in the appended claims.

WHat is claimed is:

1. A method for producing a polymerization syrup having an improved shelf life comprising:
   admixing an acrylic monomer represented by the formula $$CH_2=\overset{CH_3}{\underset{|}{C}}-COOR$$

wherein R is an alkyl moiety containing 1 to about 18 carbon atoms with effective minor amounts of 2,2-bis(allyloxymethyl)-butan-1-ol, a mercaptan and a crosslinking agent compatible with the acrylic monomer to form an intimate blend containing from about 0.1 to about 1 parts by volume of 2,2-bis(allyloxymethyl)-butan-1-ol, from about 0.5 to about 5 parts by volume of the mercaptan and from about 0.3 to about 40 parts by volume of the crosslinking agent; and
   heating the blend at a temperature of from about 80 degrees Centigrade to about 110 degrees Centigrade for a period of time effective to provide the blend with a desired viscosity as determined by the end use for the polymerization syrup.

2. The method of claim 1 wherein the mercaptan is represented by the formula

RSH wherein R is an alkyl moiety containing from about 1 to about 22 carbon atoms.

3. The method of claim 2 wherein the acrylic monomer is methyl methacrylate.

4. The method of claim 3 wherein the mercaptan is n-octyl mercaptan and the crosslinking agent is ethylene glycol dimethacrylate.

5. The method of claim 1 which further comprises incorporating into the blend from about 0.1 to about 2 parts by volume of an internal mold release agent compatible with the acrylic monomer.

6. The method of claim 1 further comprises incorporating into the blend from about 1 to about 100 parts by volume of a polycarbonate compound compatible with the acrylic monomer.

7. The method of claim 6 wherein the polycarbonate compound is allyl diglycol carbonate.

8. A method for producing an acrylic resin curable at ambient temperature and pressure such that articles produced from such acrylic resin are substantially bubble and void free, while exhibiting improved clarity, the method comprising: admixing an acrylic monomer represented by the formula $$CH_2=\overset{CH_3}{\underset{|}{C}}-COOR$$

wherein R is an alkyl moiety containing 1 to about 18 carbon atoms with effective minor amounts of 2,2-bis(allyloxymethyl)-butan-1-ol, a mercaptan and a crosslinking agent compatible with the acrylic monomer to form an intimate blend containing from about 0.1 to about 1 parts by volume of 2,2-bis(allyloxymethyl)-butan-1-ol, from about 0.5 to about 5 parts by volume of the mercaptan and from about 0.3 to about 40 parts by volume of the crosslinking agent;
   heating the blend at a temperature of from about 80 degrees Centigrade to about 110 degrees Centigrade for a period of time effective to provide the blend with a predetermined viscosity; and
   incorporating into the polymerization syrup a catalytic amount of a polymerization catalyst to effect polymerization of the syrup.

9. The method for producing an acrylic resin of claim 8 wherein the mercaptan is represented by the formula

RHS wherein R is an alkyl moiety containing from about 1 to about 22 carbon atoms.

10. The method for producing an acrylic resin of claim 9 which further includes a minor effective amount of a mold release agent compatible with the acrylic monomer.

11. The method for producing an acrylic resin of claim 10 wherein the minor effective amount of the mold release agent is an amount sufficient to provide from about 0.01 to about 2 parts by volume of the release agent in the polymerization syrup.

12. The method for producing an acrylic resin of claim 11 wherein the syrup further includes from about 1 to about 100 parts by volume of a polycarbonate compound compatible with the polymerization syrup.

13. The method for producing an acrylic resin of claim 12 wherein the mercaptan is n-octyl mercaptan and the crosslinking agent is ethylene glycol dimethacrylate.

14. The method for producing an acrylic resin of claim 13 wherein the acrylic monomer is methyl methacrylate.

15. The method for producing an acrylic resin of claim 14 wherein the polycarbonate compound is allyl diglycol carbonate.

16. A method for producing an article of an acrylic resin such that the article is substantially bubble and void free, while exhibiting improved clarity, the method comprising:
admixing an acrylic monomer represented by the formula

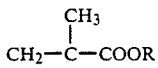

wherein R is an alkyl moiety containing 1 to about 18 carbon atoms with effective minor amounts of 2,2-bis(allyloxymethyl)-butan-1-ol, a mercaptan and a crosslinking agent compatible with the acrylic monomer to form an intimate blend containing from about 0.1 to about 1 parts by volume of 2,2-bis(allyloxymethyl)-butan-1-ol, from about 0.5 to about 5 parts by volume of the mercaptan and from about 0.3 to about 40 parts by volume of the crosslinking agent;
heating the blend at a temperature of from about 80 degrees Centigrade to about 110 degrees Centigrade for a period of time effective to provide the blend with a predetermined viscosity;
incorporating into the polymerization syrup a catalytic amount of a polymerization catalyst to effect polymerization of the syrup;
introducing the catalyst activated blend into a mold;
maintaining the catalyst activated blend in a mold for a period of time to effect curing; and
removing a resulting article from the mold.

17. The method for producing an article of an acrylic resin of claim 16 which further comprises:
heating the mold to a temperature of from about 40 degrees Centigrade to about 65 degrees Centigrade for a period of up to about 30 minutes to enhance curing of the catalyst activated blend; and
terminating heat being applied to the mold.

18. The method for producing an article of an acrylic resin of claim 17 wherein the polymerization catalyst is a quaternary ammonium salt and wherein the mercaptan is represented by the formula

RSH wherein R is an alkyl moiety containing from 1 to about 22 carbon atoms.

19. The method for producing an article of an acrylic resin of claim 18 wherein the syrup further includes from about 1 to about 100 parts by volume of a polycarbonate compound compatible with the blend.

20. The method for producing an article of an acrylic resin of claim 19 wherein the polycarbonate compound is allyl diglycol carbonate.

21. The method for producing an article of an acrylic resin of claim 20 which further includes a minor effective amount of a mold release agent compatible with the blend.

22. The method for producing an article of an acrylic resin of claim 21 wherein the minor effective amount of the mold release agent is an amount sufficient to provide from about 0.01 to about 2 parts by volume of the release agent in the polymerization syrup.

23. The method for producing an article of an acrylic resin of claim 22 wherein the mercaptan is n-octyl mercaptan and the crosslinking agent is ethylene glycol dimethacrylate.

24. The method for producing an article of an acrylic resin of claim 23 wherein the acrylic monomer is methyl methacrylate, and the mold release agent is sodium dioctyl sulfosuccinate.

* * * * *

UNITED STATES PATENT AND TRADEMARK OFFICE
CERTIFICATE OF CORRECTION

PATENT NO. : 5,023,313
DATED : June 11, 1991
INVENTOR(S) : Bill R. Edwards

It is certified that error appears in the above-identified patent and that said Letters Patent is hereby corrected as shown below:

Column 1, line 4, delete "copening" and substitute therefor --copending--;

Column 2, line 51, after "pressure." start a new paragraph with "Still an-";

Column 4, line 17, after "incorporated" delete "not" and substitute therefor --into--;

Column 4, line 34, after "need" delete "Lo" and substitute therefor --to--;

Column 5, line 33, after "the" delete "mod" and substitute therefor --mold--;

Column 6, line 38, delete "2, 2-bis(allyloxymethyl)-butan1-ol," and substitute therefor --2,2-bis(allyloxymethyl)-butan-1-ol--;

Column 6, line 55, after "syrup" delete "ca" and substitute therefor --can--;

Column 7, lines 3 and 4, delete "not the nitrate blend," and substitute therefor --into the intimate blend--;

Column 7, line 8, after "obtained" delete "When" and substitute therefor --when--;

UNITED STATES PATENT AND TRADEMARK OFFICE
CERTIFICATE OF CORRECTION

PATENT NO. : 5,023,313
DATED : June 11, 1991
INVENTOR(S) : Bill R. Edwards

It is certified that error appears in the above-identified patent and that said Letters Patent is hereby corrected as shown below:

Column 8, line 8, delete "500 m" and substitute therefor --500 ml--;

Column 8, line 9, delete "2, 2-bis(alyloxymethyl)-butan-1-ol" and substitute therefor --2,2-bis(allyloxymethyl)-butan-1-ol;

Column 8, line 40, after "that" delete "30 m of polycarbonate" and substitute therefor --30 ml of a polycarbonate--;

Column 8, line 43, delete "carbonate-compound" and substitute therefor --carbonate compound--;

Column 8, line 47, after "storage" delete "period It" and substitute therefor --period. It--;

Column 8, line 55, after "provided" delete "Which" and substitute therefor --which--;

UNITED STATES PATENT AND TRADEMARK OFFICE
CERTIFICATE OF CORRECTION

PATENT NO. : 5,023,313

DATED : June 11, 1991

INVENTOR(S) :

It is certified that error appears in the above-identified patent and that said Letters Patent is hereby corrected as shown below:

Column 8, line 66, after "procedure" delete "o" and substitute therefor --of--; and Column 10, line 25 (claim 6, line 1), after "claim" delete "1" and substitute therefor --5--.

Signed and Sealed this

Fifteenth Day of December, 1992

Attest:

DOUGLAS B. COMER

*Attesting Officer*  *Acting Commissioner of Patents and Trademarks*